(No Model.)

A. H. HOYT.
ELECTRICAL MEASURING INSTRUMENT.

No. 600,265. Patented Mar. 8, 1898.

Witnesses
H. W. Eastman
F. P. Thrasher

Inventor
Adrian H. Hoyt.
By his Attorney J. P. Thurston

UNITED STATES PATENT OFFICE.

ADRIAN H. HOYT, OF PENACOOK, NEW HAMPSHIRE.

ELECTRICAL MEASURING INSTRUMENT.

SPECIFICATION forming part of Letters Patent No. 600,265, dated March 8, 1898.

Application filed July 2, 1897. Serial No. 643,223. (No model.)

*To all whom it may concern:*

Be it known that I, ADRIAN H. HOYT, a citizen of the United States, residing at Penacook, in the county of Merrimac and State of New Hampshire, have invented certain new and useful Improvements in Electric Measuring Instruments; and I do hereby declare the following to be a full, clear, and exact description of the invention, such as will enable others skilled in the art to which it appertains to make and use the same.

This invention relates to a class of instruments designed to record the maximum current used in an electric circuit during any given period of time; and the important feature of my invention is to provide, wholly by mechanism, means whereby such an instrument will accurately register the maximum load in a run of twenty-four hours or longer, and my improvements may be attached to ammeters or voltmeters; but as a matter of convenience I show my improvements in the present instance attached to an instrument patented by me on May 16, 1893, numbered 497,449, in which was employed a solenoid or coil adapted to receive the current to be measured coöperating with an armature having gravity resistances to its oscillatory action and a pointer for indicating the strength of the current registering upon a suitably-graduated scale, and these parts may all be identical in carrying out my present invention, and to these I add my novel mechanical means for obtaining the measurement of a maximum current or load upon a circuit between any two observations.

Hence the object of my invention is to provide an instrument which will accurately record the maximum load or force of current used in an electrical circuit at any one time between any two observations and to accomplish this by mechanical means—such, for instance, as a pawl and ratchet or clutches—so arranged as to hold the movable parts which actuate the pointer and prevent the latter from again returning to zero when once the power sufficient to move them shall have passed through the instrument.

The invention will be fully set forth in the following specification and claims and clearly illustrated in drawings accompanying and forming a part of the same, of which—

Figure 1:
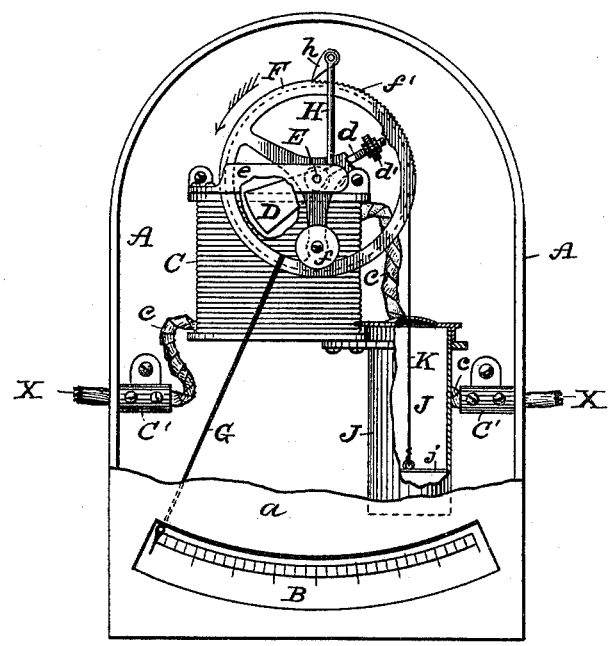
Figure 2:
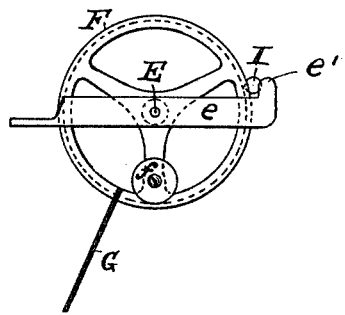

Figure 1 is a broken elevation showing my improved instrument with its front cap or cover broken away for exposing to view the interior mechanism. Fig. 2 is a detached view showing a modification of the wheel to which the pointer is attached, whereby the ratchet and pawl may be omitted.

Similar letters designate corresponding parts in both views.

A is a case within which the solenoid and the rest of the mechanism comprising my improved instrument is secured, and *a* shows a portion of its cover, which has an opening of proper form to display the graduating-scale B.

C is a solenoid or coil which receives the current to be measured from the wires X. This solenoid is wound upon a hollow core, preferably oblong in cross-section, adapting it to receive the free end of a pivoted armature D, the tendency of said solenoid being to draw the part of said armature most remote from its pivot toward its center or strongest magnetic influence, the normal position of said armature being that shown by full lines in Fig. 1 through the office of an adjustable counterweight $d'$, which may be threaded to a small arm $d$, formed integral with or attached to said armature on the opposite side of its pivotal point, thus producing a substantially constant resistance to the downward oscillation of said armature.

The arbor E, carried in a frame *e*, and to which arbor this armature is secured, also carries a wheel F, to which a pointer G may be attached, and in order to provide a variable resistance which increases as the armature departs from its normal or horizontal position the wheel F is provided with a counterweight $f$, which is vertically below said arbor E when said armature is in its normal position, as shown, and when said armature is turned the said weight $f$ moves away from the vertical position, and thus acts with increasing leverage to resist the oscillation of said armature as the latter moves from the horizontal toward the vertical position.

The above mechanism, in connection with a suitably-graduated scale B, would be capable of indicating any particular quantity or force of current passing through the solenoid, but it would not register the maximum quantity or force that has been generated on the circuit during a given period. To accomplish this I may employ various holding devices for the wheel F, one of which is to serrate the periphery of said wheel, as at $f'$ in Fig. 1, and to provide a pawl $h$, carried at the upper end of an arm H, secured to a frame $e$, said arm rising to a proper height to cause said pawl to engage the teeth or serrations $f'$, and thus prevent the wheel F from turning backward, or the frame $e$ may be extended, as shown in Fig. 2, to the farther side of said wheel, where it may be adapted to carry a suitable clutch—such, for instance, as a ball I—which will so wedge itself between the vertical projection $e'$ of said frame $e$ and the periphery of said wheel as to prevent its backward movement.

As a means of preventing or retarding the violent fluctuation or vibration of the pointer G, due to an excessive current which may pass through the solenoid for an instant only, I employ a dash-pot J, whose follower $j$ is submerged in oil, over which a small quantity of some non-evaporative substance may be placed, said follower being connected by a wire or cord K to the periphery of the wheel F, said periphery being in this instance preferably grooved to more readily carry said cord, the attachment of the dash-pot thus securing a slower registration not so easily susceptible to a sudden fluctuation of the mechanism.

C' are brackets which unite the ends of wires $c$ of the solenoid and the circuit-wires X.

Having described my improvements, what I claim is—

1. In an electric measuring instrument having a graduated scale and a pointer whose movement thereon is caused by the current on the circuit, suitable mechanism for preventing a return movement of said pointer to zero should the current be diminished or stopped after having recorded the maximum load on the circuit.

2. In an electric measuring instrument having a graduated scale and a pointer whose movement thereon is caused by the current on the circuit, a serrated pulley or wheel and a pawl adapted to engage said serrations, said wheel being connected with the axis of said pointer and by cord or wire with the follower of a dash-pot, whereby the tendency of said pointer to fluctuate by reason of a sudden or excessive current is diminished or prevented.

3. An electric measuring instrument comprising a suitably-graduated scale, a solenoid having a hollow core, an oscillating armature adapted to move within the core of said solenoid and having an adjustable counterbalance attached, a pointer connected to an arbor carrying said armature, the said arbor and suitable mechanism connected therewith for preventing a return movement of said pointer to zero after having recorded the load on the circuit and the current has been dimimished or stopped.

4. An electric measuring instrument comprising a suitably-graduated scale, a solenoid having a hollow core, an oscillating armature adapted to move within the core of said solenoid and provided with an adjustable counterbalance, a pointer connected to an arbor carrying said armature, the said arbor, suitable mechanism for indicating the maximum current or load on the circuit by holding the pointer at the highest point reached on the scale and means whereby the fluctuation of said pointer by reason of a sudden or excessive current is diminished or prevented.

In testimony whereof I affix my signature in presence of two witnesses.

ADRIAN H. HOYT.

Witnesses:
J. B. THURSTON,
HENRY E. BURNHAM.